July 14, 1964     E. J. BERNET     3,140,604
FUZZ METER
Filed April 5, 1960                                           2 Sheets-Sheet 1
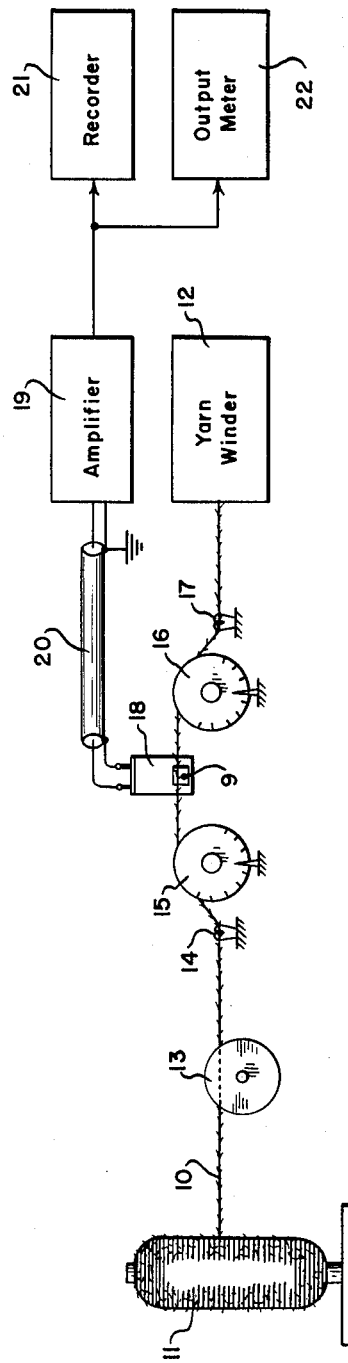
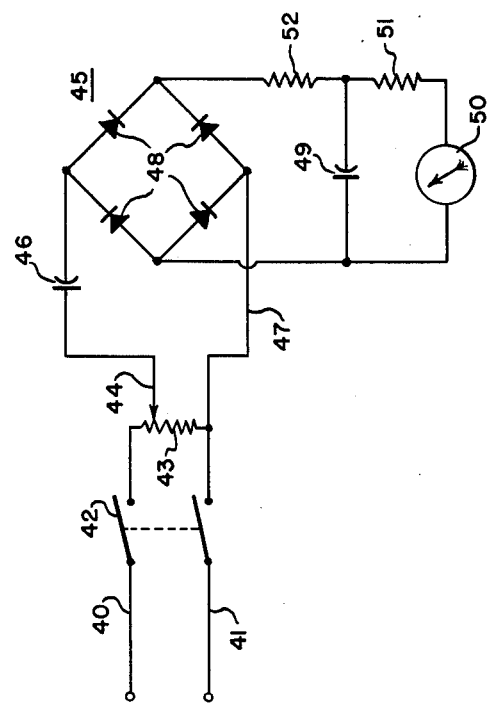
INVENTOR
Edwin J. Bernet
BY
Pennie, Edmonds, Morton, Barrows & Taylor
ATTORNEYS July 14, 1964  E. J. BERNET  3,140,604
FUZZ METER Filed April 5, 1960  2 Sheets-Sheet 2

INVENTOR
Edwin J. Bernet
BY
Pennie, Edmonds, Morton, Barrows & Taylor.
ATTORNEYS

United States Patent Office 3,140,604
Patented July 14, 1964

3,140,604
FUZZ METER
Edwin J. Bernet, Charlottesville, Va., assignor to Institute of Textile Technology, Charlottesville, Va., a corporation of Virginia
Filed Apr. 5, 1960, Ser. No. 20,103
14 Claims. (Cl. 73—160)

This invention relates to apparatus for measuring the amount of surface fuzz or hairiness present on textile yarn, and more particularly to automatic electronic apparatus which is adapted to provide a continuous quantitive measurement of the amount of surface fuzz on a running strand of textile yarn.

In the textile industry it is often of great importance to be able to measure the amount of surface fuzz or hairiness on yarn selected for the production and manufacture of woven fabrics. Excess fuzz on yarn can often present troublesome problems in the operation of textile mills. These problems include the pick up of excess size in slashing, production of excess fly, etc. Furthermore, the quantity of fuzz present on any given yarn strand provides a general indication of yarn tensile strength. Additionally, from the subjective point of view, the fuzz content of yarn used in the production of a fabric can alter the texture and general appearance of the end product. The invention therefore contributes to the achievement of greater uniformity.

Accordingly, it is important in the manufacture of high quality textiles to be able to rapidly measure the amount of surface fuzz present on yarn selected for a given production. The use of manual or visual inspection techniques quite clearly is tedious, slow and not always accurate, and hence unsatisfactory for the modern textile mill.

Accordingly, an object of the present invention is to provide apparatus which will automatically and rapidly measure the amount of fuzz projecting from the surface of a continuously moving strand of yarn independently of the yarn size.

In accordance with the invention, an electro-mechanical trandsucer having a probe element is employed to detect the presence of individual fuzz fibers on a continuously moving yarn strand. The yarn test strand is driven at a substantially constant linear velocity over a pair of grooved disc guides which support the main body of the yarn strand at a small predetermined distance from the transducer probe element so that only fuzz fibers contact the probe. The output voltage from the transducer is suitably amplified and recorded or indicated.

In a preferred embodiment of the invention, a conventional piezo-electric crystal type phonograph pickup is employed as a fuzz sensing transducer. The conventional phonograph needle is here replaced by a longer, low mass, hollow tubular element having a high stiffness-to-mass ratio. The pick-up device is rigidly mounted on a support base such that the long probe element is located near the moving yarn strand. The spatial separation between the yarn and the probe element is accurately established by adjusting the grooved disc guides so that only the fuzz fibers come in contact with the probe element. The displacement-sensitive electro-mechanical transducer generates a single electrical output pulse when each individual fuzz fiber contacts the probe. The voltage pulses produced by the trandsucer in response to a succession of fiber contacts are amplified and recorded on an oscillograph recorder or, as an alternative, or in addition, are fed to a rectifying type meter circuit and displayed on a conventional meter. The graph type recorder provides a continuous display of the voltage output pulses produced by the transducer as a function of time, whereas the meter provides an indication of the average or integrated output of the transducer. The meter thereby affords an indication of the average amount of surface fuzz present on the measured strand of yarn.

One of the novel features of the invention resides in the light-weight sensing probe for the transducer and another resides in the fact that it is located adjacent to the surface of the continuously moving yarn which is so guided that measurements made by the instrument are substantially independent of yarn size.

A further feature of the invention comprises a pair of novel grooved disc-shaped guides for maintaining the desired spatial separation between the yarn surface and the probe element. Means are provided for individually and independently turning each of the disc guides about an off-center axis to precisely adjust the spatial separation between the aforementioned probe element and the yarn body surface.

Other objects and advantages of the invention will be apparent from the following detailed description considered in conjunction with the accompanying drawings wherein:

FIG. 1 is a block diagram showing the electrical circuits for the apparatus in accordance with the invention;

FIG. 3 is a schematic circuit diagram of the output meter shown in FIG. 1.

Figure 2:
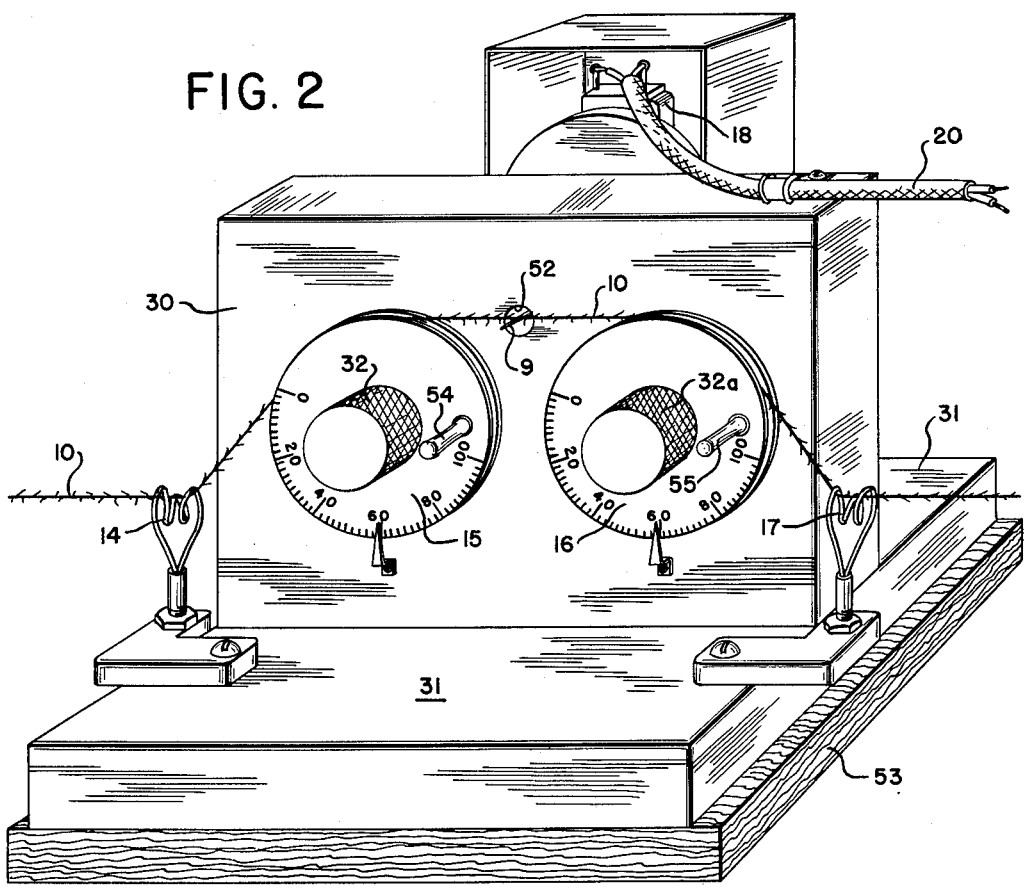
FIG. 2 is a general perspective drawing showing the various mechanical features of the invention.
Figure 2A:
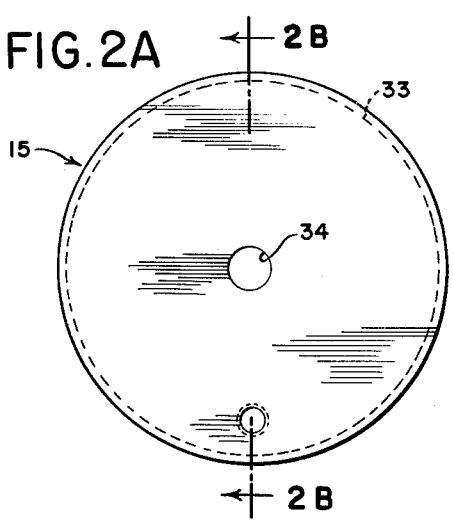
FIGS. 2A and 2B show a plan view and a sectional view, respectively, of the adjustable disc yarn guide provided by the invention.

Referring to FIG. 1, a single strand of yarn 10 is shown being removed from yarn supply bobbin 11 by a constant speed yarn winder 12. The yarn winder may be a conventional low-speed winder (constant speed type) which is well known in the art, or it may be a two cot yarn drive with a slave take-up roller which is also well known in the art. The yarn supply bobbin 11 is advantageously mounted on a free rotating spindle which permits removal of the yarn from the side of the bobbin. As indicated in the drawing, the yarn is delivered to the fuzz meter through a conventional magnetic slip-tension disc 13, through entrance eyelet 14 over the yarn guide discs 15 and 16 and finally through an exit eyelet 17. The yarn slip-tension disc is employed to minimize yarn whipping and vibration before the strand is delivered to the fuzz meter. Generation of spurious vibrational signals due to undesired vibrational contact between the yarn proper and the probe are thereby substantially eliminated. The various mechanical features of the adjustable yarn guides and other components are discussed in further detail in connection with FIG. 2 below.

A transducer 18 is provided for detecting the presence of fuzz on the surface of the yarn to be tested. This transducer sensing device is advantageously of the piezo-electric crystal type because it produces a relatively high output voltage as a function of lateral displacement. However, other forms of pick-up devices such as the magnetic type may also be satisfactorily employed. Probe 9 is provided as a sensing element and is mounted in the phonograph pickup in place of the standard needle stylus. To provide the required characteristics this probe element is advantageously made of hollow steel tubing cut to a length somewhat longer than the conventional phonograph pick-up needle in order to enhance the pick-up displacement sensitivity. In a practical operating meter a section of thin wall stainless steel hypodermic needle tubing 1½ inches long has been used successfully. The particular tubing used had an outside diameter of 0.027 inch. It has been found that this type of probe element is stiff enough and is long enough to give good sensitivity commensurate with the compliance of a conventional pick-up cartridge, and at the same time of mass low enough so that the damping of the cartridge precludes sustained vibratory oscillations following impact with each fuzz fiber. In other words, it has a high stiffness-to-mass ratio. The pick-up body is rigidly supported on a framework to assure that the probe element is maintained at a predetermined distance from the actual surface of the yarn strand. The spacing is precisely adjusted so that only the fuzz fibers of the yarn come in brush contact with the needle as the yarn is continuously moved over the grooved yarn guides 15 and 16. The pickup 18 produces a single voltage pulse each time a yarn fuzz fiber brushes in contact with probe element 9 and displaces it in a direction parallel to the axis of the yarn. Thus the pickup is vibrated and produces a series of voltage pulses, the occurrence rate, or frequency, of which is numerically proportional to the incidence of fuzz fibers contacted by the probe per unit interval of time. The voltage pulses produced by pickup 18 are connected to amplifier 19 via shielded conductor 20. Employing an optimum yarn speed, which has been found to be approximately 12 inches per second, the range of frequencies of the output voltage produced by the pickup has been found to fall between 40 and 125 cycles per second. Accordingly, the bandwidth of amplifier 19 is advantageously limited to substantially this range of frequencies to afford an optimum signal-to-noise ratio. A conventional amplifier having two or three stages and providing a maximum gain of about 500 has been found to be satisfactory in a practical working fuzz meter.

The output of amplifier 19 is connected to a recorder 21 and an output meter 22. Recorder 21 may be a conventional graph recorder which is capable of reproducing the range of frequencies mentioned above. The recorded graphical output provided by this instrument affords a reproduction of the instantaneous electrical signals produced by transducer 18. The record provided by the graphical recorder is useful for evaluating short-term variations in fuzz content of the yarn under test. Output meter 22 provides an indication of the average or integrated measure of fuzz content of the yarn under test. The operation of this meter circuit will be described more fully hereinafter in connection with FIG. 3.

Referring to FIG. 2, there are shown in the general perspective drawing several of the mechanical features of a preferred embodiment of the invention. Transducer 18 is shown rigidly supported by a mounting frame plate 30 which is in turn rigidly secured to a main base 31. Probe element 9 is shown projecting through a clearance hole 52 in the mounting plate and is prelocated so that the probe surface is supported in its rest position slightly below the surface of yarn 10. Base 31 is advantageously mounted on a shock-resistant material 53, such as felt, in order to reduce pick up of stray mechanical vibrations in the pick-up transducer 18.

Figure 2B:
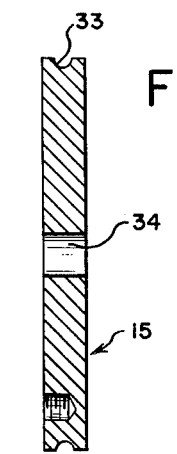

The circular grooved yarn guides 15 and 16 afford a novel, convenient and precise means for adjusting the position of yarn 10 with respect to pick-up probe 9. Each disc-shaped guide has a semi-circular shaped groove 33 (FIG. 2B) formed around the circumference thereof. An off-center hole 34 is provided for pivotally mounting each guide on the mounting frame plate 30 by a clamp screw having knurled head 32 or 32a. Input and output eyelets 14 and 17, respectively, are advantageously located somewhat below the mounting centers of the yarn guides so that the yarn is effectively wrapped around approximately 45° of each guide. The continuously moving yarn is thereby stabilized to eliminate undesired whipping vibrations in the yarn as it moves past pick-up probe 9.

The mounting holes 34 for the two circular yarn guides are drilled off-center by a predetermined distance in order to afford a precision vernier means for adjusting the relative position of the yarn with respect to the pick-up probe. In the case of guide 15, the mounting hole is displaced from its center point by 0.02 inch, whereas in guide 16, the mounting hole is displaced from its nominal center point by 0.1 inch. Thus, guide 15 may be rotated 180°, viz., given one-half turn, to effectively change the height of the yarn passing over that guide by a maximum of 0.04 inch. In the same manner, guide 16 may be rotatably adjusted to alter the height of the yarn passing over that guide by a maximum of 0.2 inch. After loosening the clamp screw 32 or 32a, either guide can be rotated by its handle 54 or 55, and the screw again tightened. If a smaller range of adjustment is sufficient, the guides need not comprise complete circles.

The guides are advantageously turned from metal such as brass, the grooved area being smoothly polished. The outer edges of the guides are advantageously graduated or calibrated in 100 divisions for a half turn. To clarify the drawing only 50 dividing marks are shown on the dials. When guide 15 is rotated one division (out of a total of 100), the yarn 10 is moved vertically by 0.0004 inch at its point of contact with the guide. Since the pick-up probe is located approximately half-way between the tops of the two guides, a one-division adjustment of guide 15 will move the yarn strand approximately 0.0002 inch closer to or further from the probe surface, as the case may be. In the same manner, the right-hand grooved guide 16 may be rotated to effect coarse positioning of the yarn with respect to the pick-up probe, because one division of rotation will move the yarn approximately 0.001 inch at the probe.

It should be noted that two conflicting factors must be considered in establishing an optimum spacing between the pick-up probe and the actual or main surface of the yarn. Pickup sensitivity is increased by reducing the spacing between the yarn surface and the pick-up probe due to the greater effective stiffness of the fuzz fibers closer to their point of attachment to the main body of the yarn. However, as the spacing is reduced, the probe becomes more sensitive to non-uniformities in the yarn dimensions and the like. A spacing of about 0.015 inch between the lower surface of the yarn and the upper edge of the probe has been found to provide an optimum compromise spacing with cotton yarns. In certain instances it is desirable to also test the yarn sample at a greater spacing, for example 0.06 inch, in order to measure the ratio of long fibers to short fibers. Guide 16 affords a convenient means for effecting the large change in spacing.

Although the pick-up probe 9 shown in the drawing will operate effectively as a fuzz sensing device when located above the test yarn, an operational advantage is achieved in accordance with the invention by locating the probe element adjacent to the lower surface which rides in the grooved guides. As indicated above, when the probe element is disposed in the latter position, the meter may be used to test yarns of different thicknesses without the need for re-adjusting the spacing between the yarn surface and the pick-up probe. Operational tests have established that no noticeable measurement error is produced by fuzz compression due to contact with the input yarn guide when the fuzz sensing probe is disposed below the yarn. Since the yarn is moved through the machine under a relatively small amount of tension, fuzz compression due to contact with the input guide is slight, and the yarn fuzz returns to its normal extended position with respect to the side surfaces of the yarn very rapidly after leaving the surface of the input circular guide. Test operations have also indicated that a certain amount of yarn rotation takes place as the yarn travels between the respective surfaces of the two guides. This rotational effect tends to further minimize any effect that might otherwise be observed due to pre-detection compression of the fuzz fibers.

FIG. 3 is a schematic diagram of the output meter circuit provided in accordance with this invention. Amplified pulses are supplied from amplifier 19 through input conductors 40 and 41. Double-pole single-throw switch 42 is provided as a disabling switch for the meter circuit. Potentiometer 43 serves as an input attenuator to the meter circuit and affords a convenient means for calibrating the output meter. The arm 44 of potentiometer 43 is connected to one input terminal of a full-wave bridge rectifier 45 via coupling capacitor 46. The other input terminal of the bridge rectifier is connected to the lower terminal end of potentiometer 43 via conductor 47, as shown. The full-wave bridge rectifier comprises four diodes 48 which are provided to rectify the incoming electrical pulses provided by amplifier 19. An electrical charge is thereby developed across capacitor 49 which is proportional to the amplitude and number of input pulses per unit interval of time. The signal voltage thereby developed across capacitor 49 is impressed on meter 50 through resistor 51. Since the yarn under test is driven across the yarn guides past the pick-up probe at a substantially constant linear velocity, meter 50 provides a measure of the average voltage developed there-across, and hence a measure of the average incidence of fuzz fibers per unit length of yarn being tested.

In a practical working embodiment of the meter circuit shown in FIG. 3, the following components were found to be satisfactory:

Resistors:
    43 _____ohms__ 25,000
    51, 52_____do____ 10,000
Diodes:
    48 _____ Type 1N43.
Capacitors:
    46 _____μfd__ 4
    49 _____μfd__ 500
Meter:
    μa. _____ 0–50

The above component values are given by way of example and are not intended to be limitative in any way. Many variations of the circuit shown in FIG. 3 will be apparent to those skilled in the art. In certain instances, for example, the user may find it advantageous to substitute for the meter 50 a graph recorder which might require changes in certain of the circuit elements.

Although the fuzz meter as above described might be assumed to be capable of accurately measuring the amount of surface fuzz present on a given strand regardless of the yarn rate of travel, test measurements have indicated that velocities in excess of approximately 18 inches per second cause a reduction in the measured incidence of fuzz fibers for a given strand of test yarn. The reduced measurement is attributed to an increased flattening effect on the fuzz fibers as the velocity through the air increases. A yarn velocity of 12 inches per second has been found to be satisfactory for most measurements of cotton yarn.

In a practical operating set-up of the fuzz meter provided by this invention, the output indicator meter may be advantageously calibrated by testing a plurality of reference strands having various known amounts of fuzz or hairiness. For example, the meter may be calibrated in arbitrary units between 0 and 100 and the input calibration attenuator adjusted to provide maximum deflection of 100 when the fuzziest yarn sample is caused to travel through the yarn guide at a standard velocity of 12 inches per second. Other yarn samples having lower fuzz content may be tested and the meter calibrations recorded providing thereby standard references of comparison.

Tests completed on a number of different days under normal variations of temperature and humidity indicate that excellent reliability in fuzz measurements can be effected with the meter provided by this invention. Although the type of wind on the yarn bobbin, the type of package, and the hardness of package may produce some effect on fuzz measurements, these effects are apparently of a minor order. To minimize the effects of yarn twist, the test yarn may advantageously be supplied on a bobbin adapted to be supported by a freely rotating spindle which permits removal of the yarn directly from the side thereof. Where the yarn to be tested has been packaged in a larger roll which does not lend itself to mounting on a freely rotating spindle, the yarn strand may be removed from the end of the yarn cheese. The slight twist introduced thereby into the strand will not noticeably affect the fuzz measurement.

A single preferred embodiment of the apparatus provided in accordance with this invention has been described. Other modifications within the scope of the appended claims may be made without departing from the spirit of the invention.

I claim:

1. Apparatus for automatically measuring the amount of fuzz fibers per unit length of yarn, projecting from the surface of a strand of moving yarn, comprising an electro-mechanical transducer having a probe element for sensing the presence of surface fuzz fibers on said yarn, said transducer being adapted to vibrate at audio frequencies and to produce output voltage pulses of a frequency within the lower audio-frequency range when said probe element is brought into brush contact with a succession of fuzz fibers and is moved thereby in a direction substantially parallel to the axis of the yarn, a pair of guides for guiding and supporting said yarn strand while said strand is in transit past said probe element, a frame for supporting said transducer and said guides, means supporting said transducer at a position intermediate said guides with said probe element spaced a predetermined distance from the surface of said yarn strand, microadjusting means for predetermining said distance, whereby only surface fuzz fibers come in brush contact with said probe element, means for moving said yarn strand between said guides at a substantially constant velocity such as to produce said pulses at a low audio-frequency, and indicating means adapted to respond to voltage pulses within the lower audio-frequency range produced by said transducer so as continuously to measure the amount of fuzz fibers per unit length of yarn as a function of voltage.

2. Apparatus for automatically measuring the amount of surface fuzz fibers projecting from the surface of a strand of moving yarn, comprising a displacement-sensitive electro-mechanical transducer responsive to lateral vibration at audio frequencies and having a probe element for sensing surface fuzz fibers on said yarn, said transducer being adapted to produce output voltage pulses of a frequency within the lower audio-frequency range when said probe element is brought into brush contact with a succession of fuzz fibers, a pair of disc-shaped guides having rounded grooves around at least a portion of the periphery thereof for guiding and supporting said yarn strand while said strand is in transit between said guides, a frame for supporting said transducer and said guides, means supporting said transducer at a position intermediate said guides with said probe element spaced a predetermined distance from the surface of said yarn strand, micro-adjusting means for predetermining said distance, whereby only surface fuzz fibers come in brush contact with said probe element, means for moving said yarn strand between said guides at a substantially constant velocity such as to produce said pulses at a low audio frequency, and means for indicating the voltage pulses produced by said transducer so as continuously to measure the amount of fuzz as a function of voltage.

3. The invention in accordance with claim 2 characterized in that at least one of said guides is mounted on a non-concentric axis and is rotatably adjustable about said axis to control the spacing between said yarn strand and said probe element.

4. The invention in accordance with claim 3 characterized in that each of said guides is rotatably adjustable about a different non-concentric axis, and means are provided for rotatably adjusting each guide to control the spacing between the said yarn strand and the said probe element.

5. The invention in accordance with claim 2 characterized in that the said electro-mechanical transducer is of the piezo-electric type and said probe element therefor is a light-weight thin-wall tubular member having a high stiffness-to-mass ratio.

6. Apparatus for automatically measuring the amount of surface fuzz fibers projecting from the surface of a strand of moving yarn, comprising a displacement-sensitive electro-mechanical transducer having a probe element displaceable parallel to the axis of the yarn for sensing surface fuzz fibers on said yarn, said transducer being adapted to produce an output voltage of a frequency equal to the probe element displacement frequency when said element is in brush contact with moving fuzz fibers, a pair of at least partially circular disc-shaped guides having grooves around the circular portions of the peripheries thereof for guiding and supporting said yarn strand while said strand is in transit between said guides, a frame for supporting said transducer and said guides, said transducer being supported at a position intermediate said guides with said probe element spaced a predetermined distance from the surface of said yarn strand, micro-adjusting means for predetermining said distance, whereby only surface fuzz fibers come in brush contact with said probe element, means for moving said yarn strand longitudinally at a substantially constant velocity across said guides, means for amplifying and rectifying the output voltage produced by said transducer, and a meter responsive to the voltage developed by said rectifier so as continuously to measure the amount of fuzz on the yarn.

7. Apparatus for automatically measuring the amount of suface fuzz fibers projecting from the surface of a strand of moving yarn, comprising a lateral displacement-sensitive electro-mechanical transducer having a laterally displaceable probe element for sensing surface fuzz fibers on said yarn, said probe element having a high stiffness-to-mass ratio, said transducer being adapted to produce an output voltage when said probe element is brought into brush contact with moving fuzz fibers, the frequency of said voltage being a function of the number of fuzz fibers per unit length of yarn, a pair of circular disc-shaped guides having grooves around the periphery thereof for guiding and supporting said yarn strand while said strand is in transit between said guides, a frame for supporting said transducer and said guides, said transducer being supported at a position intermediate said guides with said probe element spaced a predetermined distance from the surface of said yarn strand such that only surface fuzz fibers come in brush contact with said probe element, micro-adjusting means for predetermining said distance, means for moving said yarn strand longitudinally at a substantially constant velocity across said guides, means for amplifying the output voltage at the frequency produced by said transducer, means for rectifying the amplified voltage and a meter for measuring the voltage developed by said rectifier.

8. Apparatus for automatically measuring the amount of surface fuzz fibers projecting from the surface of a strand of moving yarn, comprising an electro-mechanical transducer having a probe element adapted to vibrate within the audio-frequency range for sensing the presence of surface fuzz fibers on said yarn, said transducer being of the type which when struck by surface fuzz fibers at a frequency within the audio-frequency range is adapted to produce output voltage pulses within said frequency range when said probe element is brought into brush contact with a succession of fuzz fibers, a pair of grooved guides for guiding and supporting said yarn strand while said strand is in transit between said guides, a frame for supporting said transducer and said guides, said transducer being supported at a position intermediate said guides with said probe element spaced a predetermined distance from and adjacent to the guide-supported surface of said yarn strand, micro-adjusting means for predetermining said distance, whereby only surface fuzz fibers come in brush contact with said probe element, means for longitudinally moving said yarn strand at a substantially constant velocity across said guides, and means for averaging and recording the voltage pulses produced by said transducer as a continuous measure of the amount of fuzz on said yarn.

9. Apparatus for automatically measuring the amount of surface fuzz fibers present on a strand of moving yarn, comprising an electro-mechanical transducer having a probe element for sensing the presence of surface fuzz fibers on said yarn, said transducer being adapted to produce output voltage pulses at a frequency within the audio-frequency range when said probe element is brought into brush contact with a succession of fuzz fibers, a pair of grooved guides spaced apart in alignment for guiding and supporting said yarn strand while said strand is in transit between said guides, a frame for supporting said transducer and said guides, said transducer and guides being supported so that said probe element is disposed at a position intermediate said guides and is spaced a predetermined distance from and adjacent to the guide-supported surface of said yarn strand, micro-adjusting means for at least one of said guides for predetermining said distance, whereby the surface of said strand is out of contact with said probe element and only surface fuzz fibers come in brush contact with said probe element, means for adjusting the spacing between said strand and said probe element, means for moving said yarn strand at a substantially constant velocity across said guides, means for recording changes in the voltage produced by said transducer, means for rectifying the output voltage produced by said transducer, and a meter which indicates the voltage developed by said rectifier as a continuous measure of the amount of fuzz on the yarn.

10. The invention in accordance with claim 1 characterized in that said probe element comprises a lightweight thin-wall tubular member having a high stiffness-to-mass ratio.

11. The invention in accordance with claim 10 in which said probe element is of stainless steel tubing of hypodermic needle type.

12. In apparatus for automatically measuring the amount of fuzz fibers projecting from the surface of a strand of yarn, the combination which includes a pair of guides spaced apart in alignment for supporting and guiding said strand, an electro-mechanical transducer having a probe for sensing the presence of fuzz fibers on the yarn, said transducer being of the type adapted to produce output voltage in response to vibration of said probe at frequencies within the audio-frequency range, means supporting said transducer and means supporting said guides so that said probe is spaced with respect to the axis of the strand by a distance at which fuzz fibers disposed on the span of yarn between said guides contact said probe and at which said probe is out of contact with the surface of said strand, and means for transporting said strand longitudinally across said guides at a constant velocity and such that the fuzz fibers come into brush contact with said probe at at least one frequency within the audio-frequency range.

13. In apparatus for automatically measuring the amount of fuzz fibers projecting from the surface of a strand of yarn, the combination which includes a pair of guides spaced apart in alignment for supporting and guiding said strand, an electro-mechanical transducer having a probe for sensing the presence of fuzz fibers on the yarn, said transducer being of the type adapted to produce output voltage in response to vibration of said probe at frequencies within the audio-frequency range, means supporting said transducer in fixed position, means supporting said guides so that the axis of the span of yarn between said guides is spaced from said probe by a distance at which the fuzz fibers contact said probe and at which the surface of the yarn is out of contact with said probe, and means for transporting said strand longitudinally across said guides at a velocity such that the fuzz fibers come into brush contact with said probe at at least one frequency within said audio-frequency range.

14. Apparatus for automatically measuring the amount of fuzz fibers projecting from the surface of a strand of yarn, which includes a pair of guides for supporting and guiding said strand, a frame supporting said guides spaced apart in alignment, an electro-mechanical transducer having a probe for sensing the presence of fuzz fibers on said yarn, said transducer being of the type adapted to produce output voltage in response to vibration of said probe at frequencies within the lower audio-frequency range, means securing said transducer to said frame, means securing said guides to said frame, means for relatively adjusting said probe and at least one of said guides so that said probe is spaced with respect to the span of yarn between said guides by a distance at which only fuzz fibers contact said probe and at which said probe is out of contact with the surface of said strand, and means for transporting said strand longitudinally across said guides at a velocity such that impacts of the fuzz fibers cause said probe to vibrate at frequencies within said audio-frequency range, a low-frequency amplifier for amplifying the output voltage of said transducer, and indicating means responsive to the amplified voltage.

References Cited in the file of this patent

UNITED STATES PATENTS

| | | |
|---|---|---|
| 2,231,537 | Keeler | Feb. 11, 1941 |
| 2,242,889 | Keeler | May 20, 1941 |
| 2,834,207 | Chamberlain et al. | May 13, 1958 |
| 3,013,429 | Maloney | Dec. 19, 1961 |

FOREIGN PATENTS

| | | |
|---|---|---|
| 1,051,568 | France | Jan. 18, 1954 |
| 754,919 | Great Britain | Aug. 15, 1956 |